United States Patent
Vanukuri et al.

(10) Patent No.: US 10,133,839 B1
(45) Date of Patent: Nov. 20, 2018

(54) SYSTEMS AND METHODS FOR ESTIMATING A POWER CONSUMPTION OF A REGISTER-TRANSFER LEVEL CIRCUIT DESIGN

(71) Applicant: Ansys, Inc., Canonsburg, PA (US)

(72) Inventors: Renuka Vanukuri, Cupertino, CA (US); Ajay Singh Bisht, San Jose, CA (US); Allen Baker, San Jose, CA (US)

(73) Assignee: Ansys, Inc., Canonsburg, PA (US)

( * ) Notice: Subject to any disclaimer, the term of this patent is extended or adjusted under 35 U.S.C. 154(b) by 125 days.

(21) Appl. No.: 15/227,512

(22) Filed: Aug. 3, 2016

Related U.S. Application Data

(60) Provisional application No. 62/203,557, filed on Aug. 11, 2015.

(51) Int. Cl.
*G06F 17/50* (2006.01)

(52) U.S. Cl.
CPC ...... *G06F 17/5045* (2013.01); *G06F 2217/78* (2013.01)

(58) Field of Classification Search
USPC ......................................................... 716/109
See application file for complete search history.

(56) References Cited

U.S. PATENT DOCUMENTS

| | | | |
|---|---|---|---|
| 2010/0030516 A1* | 2/2010 | Kambara | G06F 17/5031 702/179 |
| 2011/0041114 A1* | 2/2011 | Komatsu | G06F 17/5031 716/134 |

* cited by examiner

*Primary Examiner* — Bryce Aisaka
(74) *Attorney, Agent, or Firm* — Jones Day

(57) ABSTRACT

Systems and methods are provided for calculating a power characteristic of an integrated circuit design. For each standard cell of a gate-level netlist, a path length and a set of attributes are computed. For each leaf-level instance of a register-transfer level (RTL) netlist, a path length and a set of attributes are computed. The standard cells are partitioned into first subsets, each of the first subsets containing standard cells with a same path length and a same set of attributes. For each first subset, a relative percentage for each type of standard cell included in the first subset is calculated. The leaf-level instances are partitioned into second subsets. For each pair of corresponding first and second subsets, standard cells are associated with the leaf-level instances of the second subset based on the relative percentages. A power characteristic of the RTL netlist is calculated based on the associated standard cells.

20 Claims, 17 Drawing Sheets

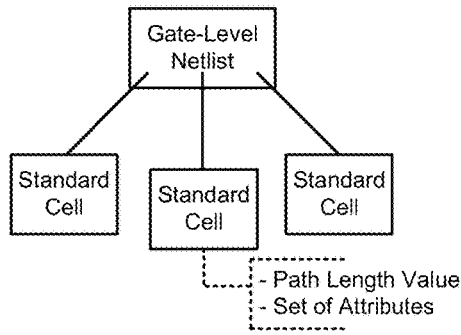
FIG. 1A
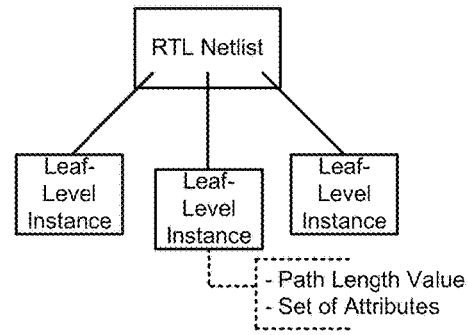
FIG. 1B
| First Subset (Path Length Value X, Set of Attributes Y) |
|---|
| - Standard Cell Type A -- 50%<br>- Standard Cell Type B -- 25%<br>- Standard Cell Type C -- 25% |
FIG. 1C
| Second Subset (Path Length Value X, Set of Attributes Y) |
|---|
| 100 Leaf-Level Instances |
FIG. 1D
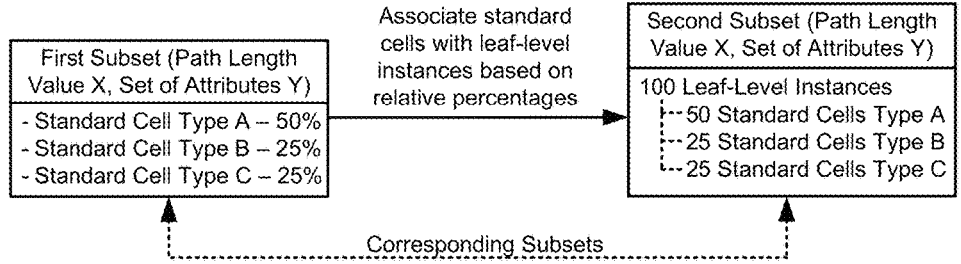
FIG. 1E

| Type | Acronym | Source Type | Sink Type |
|---|---|---|---|
| Input-to-Output | I2O | Primary Input | Primary Output |
| Input-to-Sequential | I2S | Primary Input | Sequential Element |
| Sequential-to-Output | S2O | Sequential Element | Primary Output |
| Sequential-to-Sequential | S2S | Sequential Element clocked by signal A | Sequential Element clocked by signal A |
| Clock-Domain Crossing | CDC | Sequential Element clocked by signal A | Sequential Element clocked by signal B |

FIG. 4

| Path Length Value | NAND, Path 1, Clk 1 Instances | NAND, Path 2, Clk 1 Instances | AND, Path 1, Clk 1 Instances | AND, Path 2, Clk 1 Instances |
|---|---|---|---|---|
| 1 | 50 | 50 | 50 | 50 |
| 2 | 40 | 10 | 100 | 50 |

FIG. 5A

| Path Length Value | NAND2X1, Path 1, Clk 1 Instances | NAND2X2, Path 1, Clk 1 Instances | NAND2X1, Path 2, Clk 1 Instances | NAND2X2, Path 2, Clk 1 Instances | AND2X1, Path 1, Clk 1 Instances | AND2X2, Path 1, Clk 1 Instances | AND2X1, Path 2, Clk 1 Instances | AND2X2, Path 2, Clk 1 Instances |
|---|---|---|---|---|---|---|---|---|
| 1 | 10 | 40 | 20 | 30 | 50 | 0 | 40 | 10 |
| 2 | 20 | 20 | 2 | 8 | 20 | 80 | 30 | 20 |

FIG. 5B

| Path Length Value | NAND2X1, Path 1, Clk 1 Percent | NAND2X2, Path 1, Clk 1 Percent | NAND2X1, Path 2, Clk 1 Percent | NAND2X2, Path 2, Clk 1 Percent | AND2X1, Path 1, Clk 1 Percent | AND2X2, Path 1, Clk 1 Percent | AND2X1, Path 2, Clk 1 Percent | AND2X2, Path 2, Clk 1 Percent |
|---|---|---|---|---|---|---|---|---|
| 1 | 20% | 80% | 40% | 60% | 100% | 0% | 80% | 20% |
| 2 | 50% | 50% | 20% | 80% | 20% | 80% | 60% | 40% |

FIG. 5C

| Path Length Value | NAND, Path 1, Clk 1 Instances | NAND, Path 2, Clk 1 Instances | AND, Path 1, Clk 1 Instances | AND, Path 2, Clk 1 Instances |
|---|---|---|---|---|
| 1 | 10 | 40 | 30 | 20 |
| 2 | 6 | 14 | 10 | 20 |

FIG. 5D

| Delay | NAND, Path 1, Clk 1 Instances | NAND2X1 Instances | NAND2X2 Instances | NAND, Path 2, Clk 1 Instances | NAND2X1 Instances | NAND2X2 Instances | AND, Path 1, Clk 1 Instances | AND2X1 Instances | AND2X2 Instances | AND, Path 2, Clk 1 Instances | AND2X1 Instances | AND2X2 Instances |
|---|---|---|---|---|---|---|---|---|---|---|---|---|
| 1 unit | 10 | 2 | 8 | 40 | 16 | 24 | 30 | 30 | 0 | 20 | 16 | 4 |
| 2 units | 6 | 3 | 3 | 14 | 3 | 11 | 10 | 2 | 8 | 20 | 12 | 8 |

FIG. 6A

SYSTEMS AND METHODS FOR ESTIMATING A POWER CONSUMPTION OF A REGISTER-TRANSFER LEVEL CIRCUIT DESIGN

CROSS-REFERENCE TO RELATED APPLICATIONS

This application claims priority to U.S. Provisional Patent Application No. 62/203,557, filed Aug. 11, 2015, entitled "Systems and Methods for Estimating a Power Consumption of a Register-Transfer Level Circuit Design," which is incorporated herein by reference in its entirety.

FIELD

This disclosure is related generally to computer-aided design (CAD) tools and more particularly to systems and methods for estimating a power consumption of a register-transfer level (RTL) circuit design.

BACKGROUND

In recent years, power consumption has become a key design metric for integrated circuit designs. Circuit designers need to be able to accurately estimate the power consumption of a circuit design in its early stages so that optimizations can be made before significant resources are spent refining the design. However, accurate power models are usually only available for basic circuit components, called standard cells, which are used at lower levels of abstraction and not at levels of abstraction at which circuits are generally designed. Connecting power models of standard cells to designs at higher levels of abstraction is a process called cell selection, and the cell selection process may be difficult due to the numerous possibilities for implementing complex logic functions.

SUMMARY

Systems, methods, and non-transitory computer-readable storage mediums are provided for calculating a power characteristic of a register-transfer level (RTL) netlist of an integrated circuit (IC) design. In an example computer-implemented method for calculating a power characteristic of an RTL netlist of an IC design, for each standard cell of a gate-level netlist of an IC design, (i) a path length value that is based on a longest signal path on which the standard cell is located in the gate-level netlist, and (ii) a set of attributes associated with the standard cell are computed. For each leaf-level instance of an RTL netlist of the IC design, (i) a path length value that is based on a longest signal path on which the instance is located in the RTL netlist, and (ii) a set of attributes associated with the instance are computed. The leaf-level instances of the RTL netlist are specified at a higher level of abstraction than the standard cells. The standard cells are partitioned into first subsets, each of the first subsets containing standard cells with a same path length value and a same set of attributes. For each first subset, a relative percentage for each type of standard cell included in the first subset is calculated, where the relative percentage indicates a percentage of a total number of standard cells of the first subset that are a particular type of standard cell. The leaf-level instances are partitioned into second subsets, each of the second subsets containing leaf-level instances with a same path length value and a same set of attributes. Pairs of corresponding first and second subsets are determined. For each pair of corresponding subsets, standard cells are associated with the leaf-level instances of the second subset based on the relative percentages of the first subset. A power characteristic of the RTL netlist is calculated based on the standard cells associated with the leaf-level instances.

An example computer-implemented system for calculating a power characteristic of an RTL netlist of an IC design includes a processing system and a memory in communication with the processing system. The processing system is configured to execute steps. In executing the steps, for each standard cell of a gate-level netlist of an IC design, (i) a path length value that is based on a longest signal path on which the standard cell is located in the gate-level netlist, and (ii) a set of attributes associated with the standard cell are computed. For each leaf-level instance of an RTL netlist of the IC design, (i) a path length value that is based on a longest signal path on which the instance is located in the RTL netlist, and (ii) a set of attributes associated with the instance are computed. The leaf-level instances of the RTL netlist are specified at a higher level of abstraction than the standard cells. The standard cells are partitioned into first subsets, each of the first subsets containing standard cells with a same path length value and a same set of attributes. For each first subset, a relative percentage for each type of standard cell included in the first subset is calculated, where the relative percentage indicates a percentage of a total number of standard cells of the first subset that are a particular type of standard cell. The leaf-level instances are partitioned into second subsets, each of the second subsets containing leaf-level instances with a same path length value and a same set of attributes. Pairs of corresponding first and second subsets are determined. For each pair of corresponding subsets, standard cells are associated with the leaf-level instances of the second subset based on the relative percentages of the first subset. A power characteristic of the RTL netlist is calculated based on the standard cells associated with the leaf-level instances.

An example non-transitory computer-readable storage medium for calculating a power characteristic of an RTL netlist of an IC design includes computer-executable instructions which, when executed, cause a processing system to execute steps. In executing the steps, for each standard cell of a gate-level netlist of an IC design, (i) a path length value that is based on a longest signal path on which the standard cell is located in the gate-level netlist, and (ii) a set of attributes associated with the standard cell are computed. For each leaf-level instance of an RTL netlist of the IC design, (i) a path length value that is based on a longest signal path on which the instance is located in the RTL netlist, and (ii) a set of attributes associated with the instance are computed. The leaf-level instances of the RTL netlist are specified at a higher level of abstraction than the standard cells. The standard cells are partitioned into first subsets, each of the first subsets containing standard cells with a same path length value and a same set of attributes. For each first subset, a relative percentage for each type of standard cell included in the first subset is calculated, where the relative percentage indicates a percentage of a total number of standard cells of the first subset that are a particular type of standard cell. The leaf-level instances are partitioned into second subsets, each of the second subsets containing leaf-level instances with a same path length value and a same set of attributes. Pairs of corresponding first and second subsets are determined. For each pair of corresponding subsets, standard cells are associated with the leaf-level instances of the second subset based on the relative percentages of the first subset. A power characteristic of the RTL netlist is calculated based on the standard cells associated with the leaf-level instances.

BRIEF DESCRIPTION OF THE DRAWINGS

FIGS. 1A-1E depict aspects of an example system and method for determining a power characteristic of an RTL netlist of an IC design.

FIG. 4 is a table containing information on different path type attributes that may be utilized in the systems and methods described herein.

FIG. 5A depicts an example partitioning of standard cells into eight (8) different subsets.

FIGS. 5B and 5C depict a number of instances and relative percentages for each type of standard cell contained in the subsets of FIG. 5A.

FIG. 5D depicts an example partitioning of RTL leaf-level instances into eight (8) different subsets.

FIG. 6A is a table depicting an example mapping of standard cells to leaf-level instances for the example of FIGS. 5A-5D.

DETAILED DESCRIPTION

Figure 2:
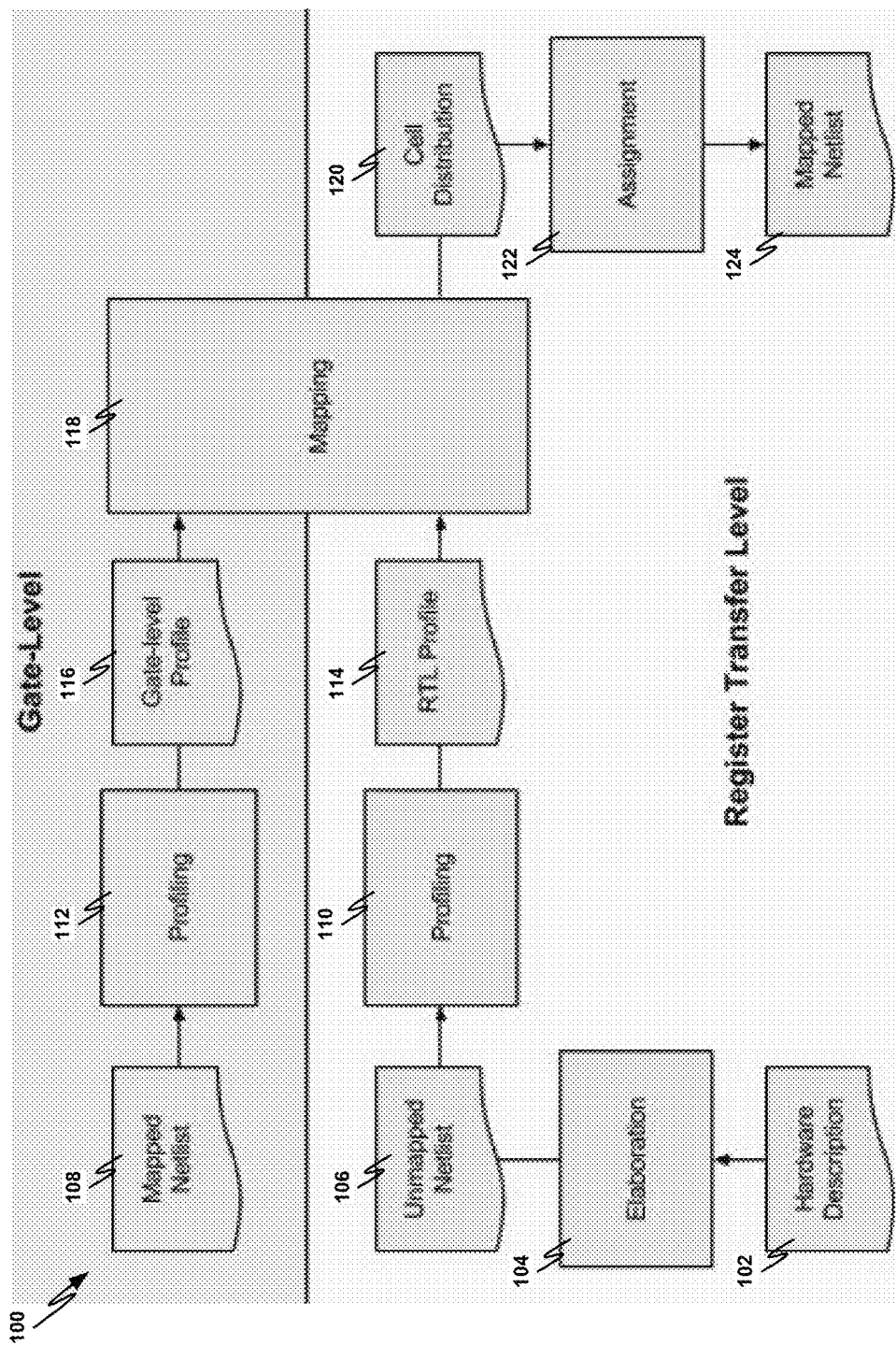
FIG. 2 is a flow diagram depicting high-level steps of a method for determining a power characteristic of an RTL netlist of an IC design.

A register-transfer level (RTL) description of an integrated circuit describes the circuit's registers and the sequence of transfers between the registers. Accurate power models are generally not available for components of an RTL description. Instead, accurate power models are usually only available for standard cells of a gate-level design (i.e., a physical design). A gate-level design is a circuit description that is specified at a lower level of abstraction than an RTL description and comprises instances of standard cells and signal nets that connect the standard cells. The process of estimating power characteristics of an RTL design using power models associated with gate-level designs is known as "cell selection." In embodiments of the systems and methods described herein, a cell selection procedure is based on an existing gate-level design generated in a previous design process. The approaches described herein thus enable reuse of existing gate-level designs for the purpose of estimating power characteristics of a new RTL design. To illustrate example features of these systems and methods, reference is made to FIGS. 1A-1E.

FIG. 1A depicts features of a gate-level netlist of an integrated circuit design. As shown in the figure, the gate-level netlist includes multiple standard cells. Although the illustration of FIG. 1A depicts only three standard cells, it should be understood that the gate-level netlist may include any number of standard cells (e.g., tens, hundreds, thousands, etc.). For each of the standard cells, a path length value and a set of attributes are determined, as illustrated in the figure. The path length value is based on a longest signal path on which the standard cell is located in the gate-level netlist. In an example, the set of attributes associated with a standard cell include (i) a path type associated with the longest signal path on which the standard cell is located in the gate-level netlist, (ii) a logic type of the standard cell, and (iii) a clock frequency associated with the standard cell. The determination of the path length value and set of attributes for a standard cell are described in greater detail below.

FIG. 1B depicts features of an RTL netlist of the integrated circuit design. The RTL netlist may comprise a design hierarchy tree. Instances of the RTL netlist that lie on the bottom (i.e., the leaf-level) of the design hierarchy tree may be known as "leaf-level instances," where a leaf-level instance does not contain any other instances. As shown in FIG. 1B, the RTL netlist includes multiple leaf-level instances, where each of the leaf-level instances is specified at a higher level of abstraction than the standard cells of the gate-level netlist of FIG. 1A. Although the illustration of FIG. 1B depicts only three leaf-level instances, it should be understood that the RTL netlist may include any number of leaf-level instances. For each of the leaf-level instances, a path length value and a set of attributes are determined, as illustrated in the figure. The path length value is based on a longest signal path on which the leaf-level instance is located in the RTL netlist. In an example, the set of attributes associated with a leaf-level instance include (i) a path type associated with the longest signal path on which the leaf-level instance is located in the RTL-level netlist, (ii) a logic type of the leaf-level instance, and (iii) a clock frequency associated with the leaf-level instance. Such attributes are examples only and different attributes may be utilized in other embodiments.

In the systems and methods described herein, the standard cells of FIG. 1A are partitioned into first subsets. Each of the first subsets contains standard cells that share a same path length value and a same set of attributes. To illustrate this, FIG. 1C depicts a first subset containing standard cells that have a path length value "X" and a set of attributes "Y." For example, all standard cells of the first subset shown in FIG. 1C may have a path length value of "1" (e.g., representative of a 1 ns delay along the longest signal path on which the standard cells lie), a logic type of "NAND," a clock frequency of 100 MHz, and a path type of "input-to-output."

For each of the first subsets, a relative percentage for each type of standard cell included in the first subset is determined, where the relative percentage indicates a percentage of a total number of standard cells of the first subset that are a particular type of standard cell. In the example of FIG. 1C, relative percentages of 50%, 25%, and 25% are determined for Standard Cell Types A, B, and C, respectively. Thus, 50% of the standard cells included in the first subset are of Type A, 25% are of Type B, and 25% are of Type C. In the example described above, where all standard cells of the first subset have a logic type "NAND," Standard Cell Type A may be a "NAND2X1" gate, Standard Cell Type B may be a "NAND2X2" gate, and Standard Cell Type C may be a "NAND2X4" gate. Each of these particular standard cell types implement the NAND logic function and are known to those of ordinary skill in the art.

The leaf-level instances of FIG. 1B are partitioned in a manner similar to that employed for the standard cells of FIG. 1A. Specifically, the leaf-level instances of FIG. 1B are partitioned into second subsets, where each of the second subsets contains leaf-level instances that share a same path length value and a same set of attributes. To illustrate this, FIG. 1D depicts a second subset containing leaf-level instances that have a path length value "X" and a set of attributes "Y." For example, all leaf-level instances of the second subset shown in FIG. 1D may have a path length value of "1" (e.g., representative of a 1 unit delay along the longest signal path on which the leaf-level instances lie), a logic type of "NAND," a clock frequency of 100 MHz, and a path type of "input-to-output."

Following the partitioning of the standard cells and leaf-level instances into the respective first and second subsets, corresponding first and second subsets are determined. In the example of FIGS. 1C and 1D, the first subset of FIG. 1C corresponds to the second subset of FIG. 1D because the subsets share a path length value ("X") and a set of attributes ("Y"). These subsets are shown as being corresponding in FIG. 1E. For each pair of corresponding subsets, standard cells are associated with the leaf-level instances of the second subset based on the relative percentages of the first subset. To illustrate this, in FIG. 1E, standard cells are associated with the 100 leaf-level instances contained in the second subset based on the relative percentages of the first subset (i.e., 50% Standard Cell Type A, 25% Standard Cell Type B, and 25% Standard Cell Type C). In the example of FIG. 1E, the 100 leaf-level instances are associated with 50 standard cells of Type A, 25 standard cells of Type B, and 25 standard cells of Type C.

The associating of standard cells with leaf-level instances may be known as an "assignment" procedure. In the assignment procedure, for each leaf-level instance, one or more standard cells are assigned to the leaf-level instance. The assignment of standard cells to leaf-level instances may be done in any arbitrary manner. Thus, for example, in the example above, where there is a 1:1 assignment between leaf-level instances and standard cells (e.g., each of the 100 leaf-level instances is assigned exactly one standard cell), the 50 Type A standard cells, the 25 Type B standard cells, and the 25 Type C standard cells may be assigned to individual leaf-level instances of the 100 leaf-level instances in any arbitrary manner (e.g., without regard to locations of the leaf-level instances in the model, etc.).

A power characteristic of the RTL netlist is determined based on the standard cells associated with the leaf-level instances. For example, power consumption of the RTL netlist may be determined based on the standard cells associated with the leaf-level instances. The determination of power characteristics of an RTL netlist based on the associated standard cells is described in greater detail below. The cell selection procedure described herein may enable power characteristics of an RTL design to be determined in a manner that is more accurate as compared to existing cell selection procedures. Additionally, the cell selection procedure described herein may enable the power characteristics of the RTL design to be determined more efficiently than in conventional approaches. In the conventional approaches, a "synthesis" procedure is utilized in estimating power characteristics of an RTL netlist. In the synthesis procedure, the RTL netlist is converted into a gate-level design, and the power characteristics of the RTL netlist are then estimated based on the synthesized gate-level design. The synthesis procedure is computationally intensive and requires relatively large computer memory resources. The synthesis procedure is also very time-consuming.

The approaches described herein do not utilize the synthesis procedure. Instead, in the approaches described herein, an existing gate-level netlist of an integrated circuit design is used in estimating power characteristics of an RTL netlist of the integrated circuit design. The existing gate-level netlist is not generated based on the RTL netlist, and instead, the gate-level netlist may be a netlist generated in a previous design process. The use of the techniques described herein, which do not include the conventional synthesis procedure and which make use of existing gate-level designs, improve the functioning of a computer system as compared to the conventional approaches because the techniques described herein permit power characteristics of an RTL netlist to be determined more efficiently (e.g., faster and with smaller memory requirements) and with a reduced processing burden as versus the conventional approaches. It is further noted that the techniques described herein improve the functioning of the computer system without sacrificing accuracy in the determination of the power characteristics. Specifically, significant efficiency improvements are realized due to the fact that the cell assignment method of the present disclosure is usable for logic paths that may not be elaborated (e.g., decomposed) in a most efficient way. Conventional synthesis tools must implement all paths such that the given time delay constraints are satisfied. This responsibility may result in a path being repeatedly re-implemented until a satisfying solution is found. The techniques of the present disclosure have no such guarantee and thus save significant effort in the elaboration stage. In embodiments of the present disclosure, elaboration must only be effective enough such that the power consumption of the design after cell assignment must be similar (e.g., within 10 percent) to the fully synthesized design.

FIG. 2 is a flow diagram 100 depicting high-level steps of a method for determining a power characteristic of an RTL netlist of an IC design. The method uses a gate-level netlist 108 of the IC design, where the gate-level netlist 108 comprises a plurality of standard cells. In an example, the gate-level netlist 108 is an "existing" netlist generated in a previous design process and is specified at a low-level, physical design level of abstraction. The IC design may also be specified at a higher-level, RTL level of abstraction in an RTL hardware description 102. In an example, the standard cells of the gate-level netlist 108 are cells of a cell set or library that will be used in implementing the RTL hardware description 102 in hardware. The RTL hardware description 102 and gate-level netlist 108 may share other traits, including application type and clock frequency.

At block 104 in FIG. 2, the RTL hardware description 102 is elaborated into an RTL netlist 106 comprising a plurality of leaf-level instances, where each of the leaf-level instances corresponds to a simple logic or arithmetic operator. The simple logic and arithmetic operators may include, for example, AND, OR, NAND, NOR, XOR, XNOR, AOI21, OAI21, AOI22, OAI22, AO21, OA21, MUX, DECODER, UNENCODED MUX, ADDER (e.g., such as ripple carry adder, carry look ahead adder, etc.), MULTIPLIER (e.g., such as booth multiplier, array multiplier etc.), SHIFT logic, COMPARATOR logic, INVERTER, and BUFFER. In the elaboration process, logical expressions that relate sequential elements of the RTL hardware description 102 are broken down into the logic and arithmetic operators described above, and each of the leaf-level instances of the RTL netlist 106 implements a logic or arithmetic operator. The RTL netlist 106 may resemble a gate-level netlist, but the leaf-level instances of the RTL netlist 106 are specified at a higher level of abstraction than the standard cells of the gate-level netlist 108. Thus, for instance, a leaf-level instance of the RTL netlist 106 may correspond to a "NAND" logic operator. By contrast, a standard cell of the gate-level netlist 108 may correspond to a particular "NAND2X4" logic gate that can be implemented in hardware.

At blocks 110 and 112 of FIG. 2, profiles 114, 116 of the RTL netlist 106 and the gate-level netlist 108, respectively, are determined. Determining the profile 114 of the RTL netlist 106 includes determining, for each leaf-level instance of the RTL netlist 106, (i) a path length or total time delay of a longest signal path on which the instance is located in the RTL netlist 106, and (ii) a set of attributes associated with the instance. Determining the profile 116 of the gate-level netlist 108 similarly includes determining, for each standard cell of the gate-level netlist 108, (i) a path length or total time delay of a longest signal path on which the standard cell is located in the gate-level netlist 108, and (ii) a set of attributes associated with the standard cell. A length of a path, as referred to herein, is defined as a sum of propagation delays of instances (i.e., leaf-level instances or standard cells) that lie on the path, and net delays do not contribute to the length.

Figure 3A:
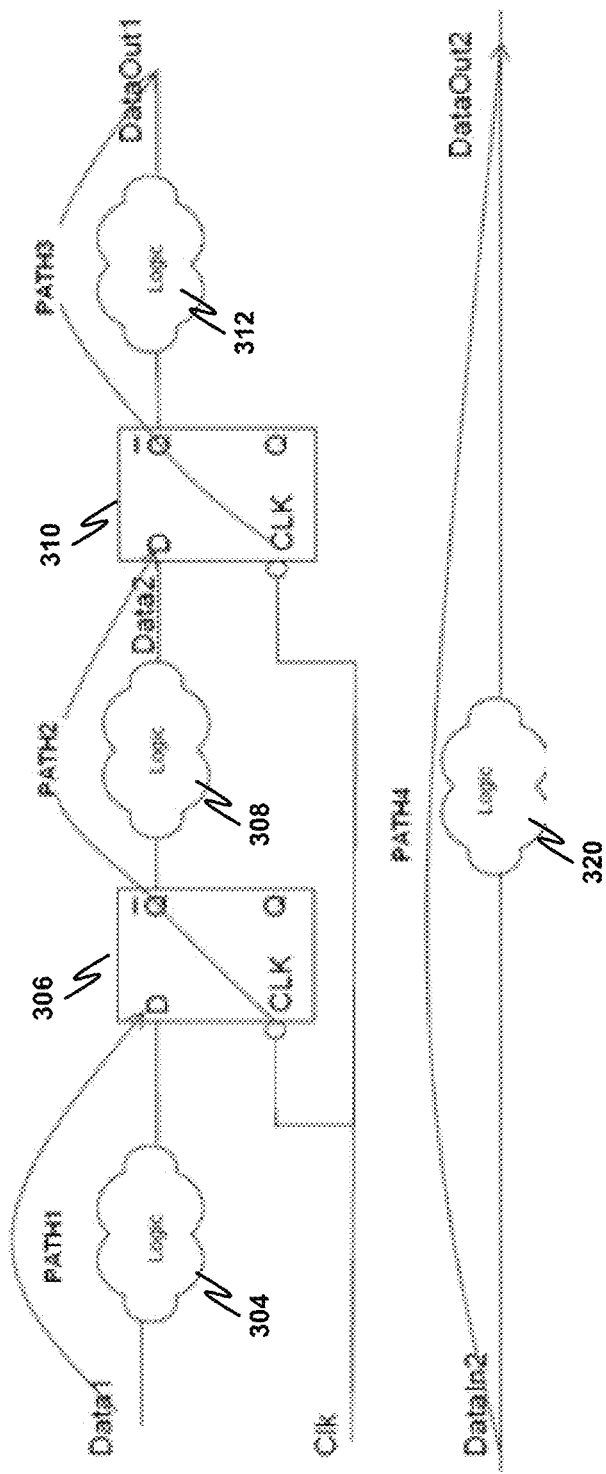
FIG. 3A depicts a sequential digital logic circuit including multiple paths.

A path is defined as the sequence of nets, pins, and instances that a signal can travel through in a single cycle of a clock that triggers the sequential elements that launch and/or receive the signal. Thus, the leaf-level instances and standard cells that lie on a path are all combinational, and a path is terminated by sequential elements. All circuits contain one or several paths. Two or more paths that originate at different locations may converge at instances (i.e., leaf-level instances or standard cells) that use several inputs to calculate a single output. Also, a path can diverge into several paths either at net fanout points or at instances with several outputs that are calculated using similar inputs. FIG. 3A depicts a sequential digital logic circuit including multiple paths (paths 1-4, as depicted in the figure). The paths of this figure are terminated by sequential elements 306, 310 and by sequential elements that launch and receive signals (not depicted in FIG. 3A). Combinational logic 304, 308, 312, 320 that lies on the signal paths may include leaf-level instances or standard cells.

With reference again to FIG. 2, path lengths (i.e., total time delays) of the longest signal paths on which each of the leaf-level instances and standard cells is located are determined, as described above. To determine these path lengths, paths of the RTL netlist 106 and the gate-level netlist 108 are analyzed. For the gate-level netlist 108, accurate timing models are available for each of the standard cells included in the netlist 108. These models use input slew and output load to determine a delay from an input pin of a standard cell to an output pin. The determination of path lengths based on such timing models may be carried out using conventional, computer-based algorithms known to those of ordinary skill in the art. For the RTL netlist 106, no such models are available, so the delay must be estimated using different methods.

FIGS. 3B-3G are used in describing aspects of determining path lengths (i.e., delays) of paths of the RTL netlist 106. In an example, RTL delay is estimated by performing a quick synthesis of RTL logic that mimics a full synthesis program and is more efficient in terms of runtime. After the quick synthesis is complete and the basic architecture is determined, delay macro models are constructed, where such macro models comprise functions that compute delay for all of the operators used in the RTL logic in terms of the operands and their size.

Figure 3B:
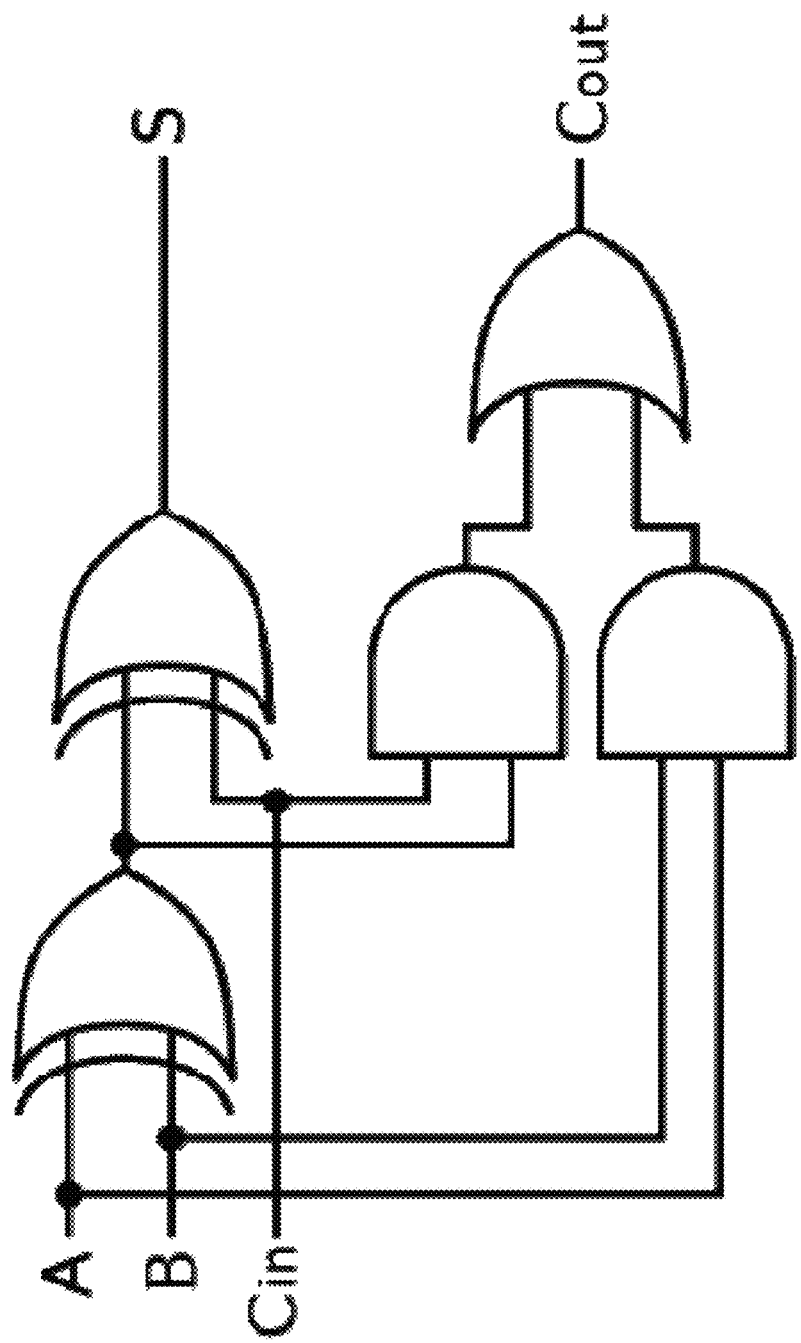
FIGS. 3B-3G are used in describing aspects of determining path lengths of paths of an RTL netlist.
Figure 3C:
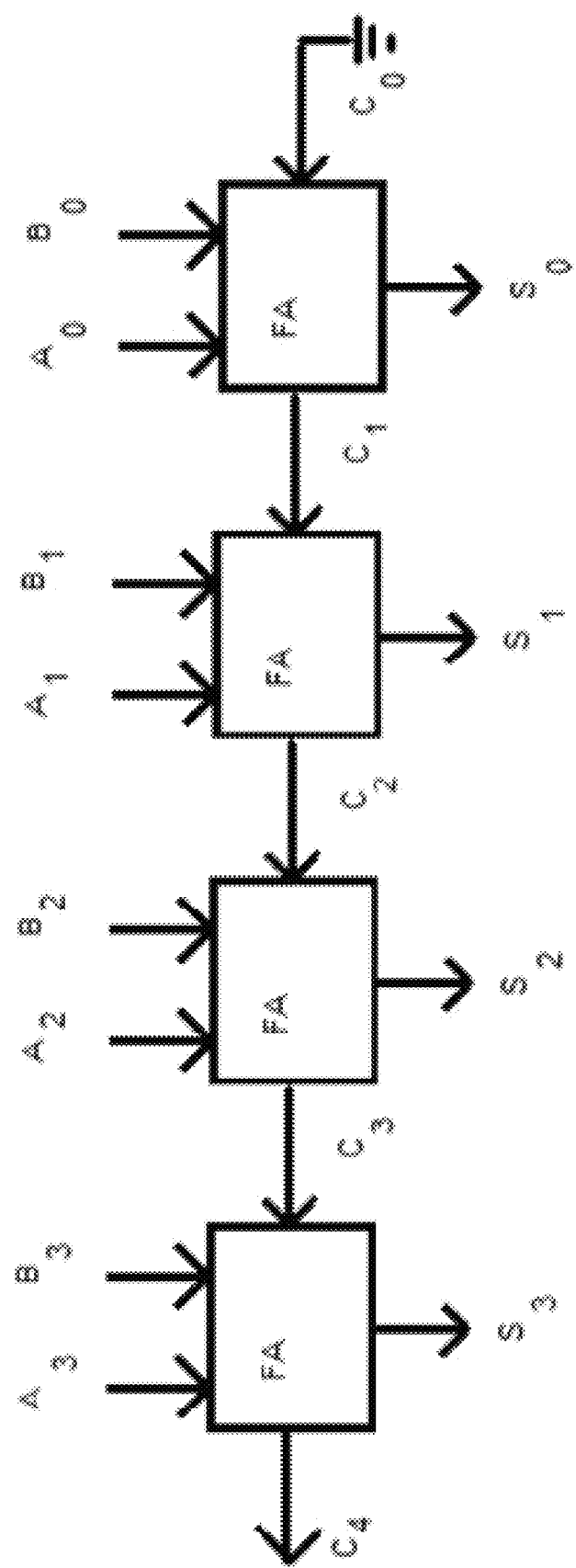

In an example, the macro models are developed for all of the sub-circuits of the gate-level implementations of RTL operators. For example, a simple ripple carry adder macro model corresponds to a gate-level implementation including AND, OR, and XOR gates, as shown in FIG. 3B. The path delay for such an implementation can be computed using standard cell delay models associated with the NAND, INVERTER, and XOR primitives. RTL AND delay is computed as a summation of NAND delay and an INVERTER delay. RTL OR delay is computed as a summation of an INVERTER delay and a NAND gate delay. Once the delay macro model is developed for a 2-bit full adder, the delay macro model can used to compute the delay for an n-bit full adder. In an example, the delay for the n-bit full adder is given by the function nT, where T is the delay of the 2-bit full adder. An n-bit ripple carry adder is shown in FIG. 3C.

Figure 3D:
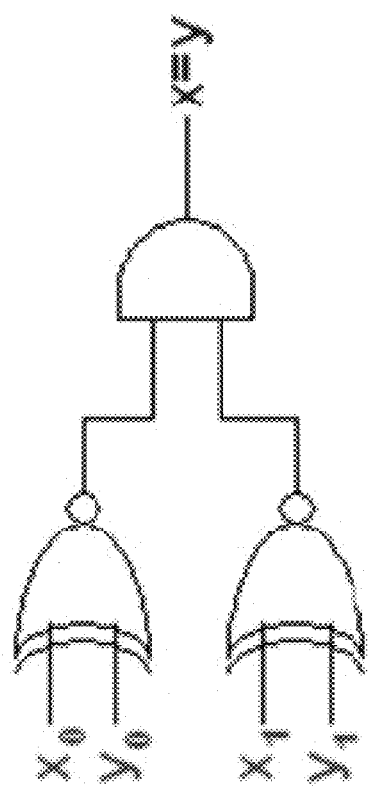

In a similar manner, the delay of an n-bit magnitude comparator is computed by first developing a delay macro model for a 2-bit magnitude comparator. For an equality operation, the delay of the 2-bit comparator is developed in terms of the XOR, NAND, and INVERTER delays. Specifically, in an example, the delay of the 2-bit comparator is computed as a sum of XOR, NAND, and INVERTER delays. The delays for XOR, NAND, and INVERTER are obtained from corresponding standard cell delay models. A 2-bit equality comparator is shown in FIG. 3D. In an example, when extended to an n-bit equality operator, the macro model computes the delay as a summation of XOR delay and an n-input AND gate delay. The AND gate delay is obtained using the standard cell delay models corresponding to NAND and INVERTER.

Figure 3E:
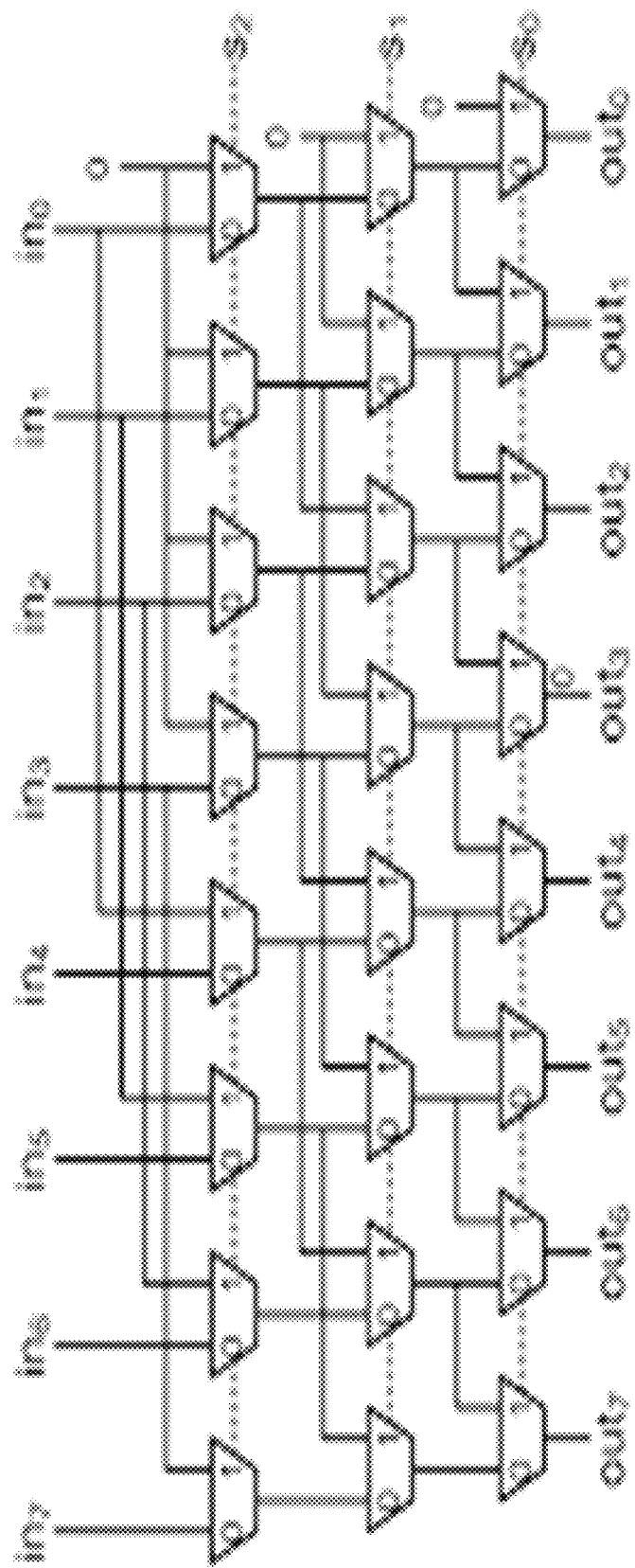

A barrel shifter (e.g., as shown in FIG. 3E) is a digital circuit that can shift a data word by a specified number of bits in one clock cycle. A barrel shifter is often implemented as a cascade of parallel 2×1 multiplexers. In such an implementation, the output of one multiplexer is connected to the input of the next multiplexer in a way that depends on the shift distance. In an example, an n-bit logarithmic barrel shifter uses $log_2(n)$ stages, and a delay macro model for an n-bit logarithmic barrel shifter computes the delay as $log_2(n)*MUX21$. The delay for MUX21 is obtained from the standard cell delay model corresponding to MUX21.

Figure 3F:
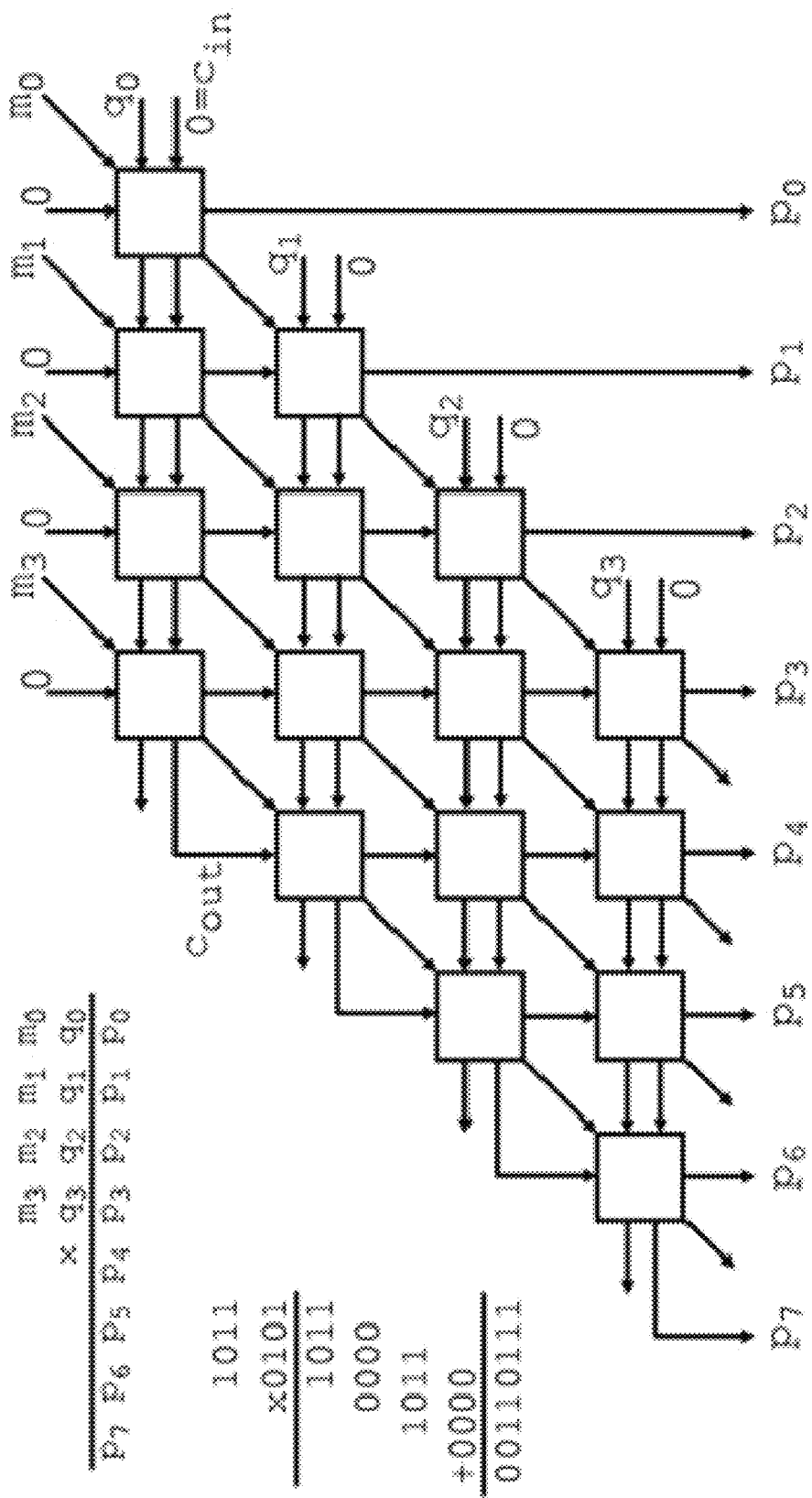

A multiplication operation of two n-digit numbers is based on $n^2$ one digit by one digit multiplications, and n additions of n digit numbers, which are appropriately shifted to the correct positions. With binary numbers, the multiplication of one binary digit "a" by another binary digit "b" is a logical AND operation between "a" and "b." An array multiplier increases the speed of the addition operation by performing the addition in parallel by an array of n(n−1) full adders interconnected as shown in FIG. 3F. The delay macro model for an array multiplier computes the delay based on delays associated with full adder and AND gates. Specifically, in an example, the delay macro models compute the delay as a summation of 2-input AND delay and 2n−2 full adder delays. The delay for AND is obtained from standard cell models corresponding to NAND and INVERTER gates, and the delay for the full adder is obtained from standard cell models corresponding to the full adder circuit.

Figure 3G:
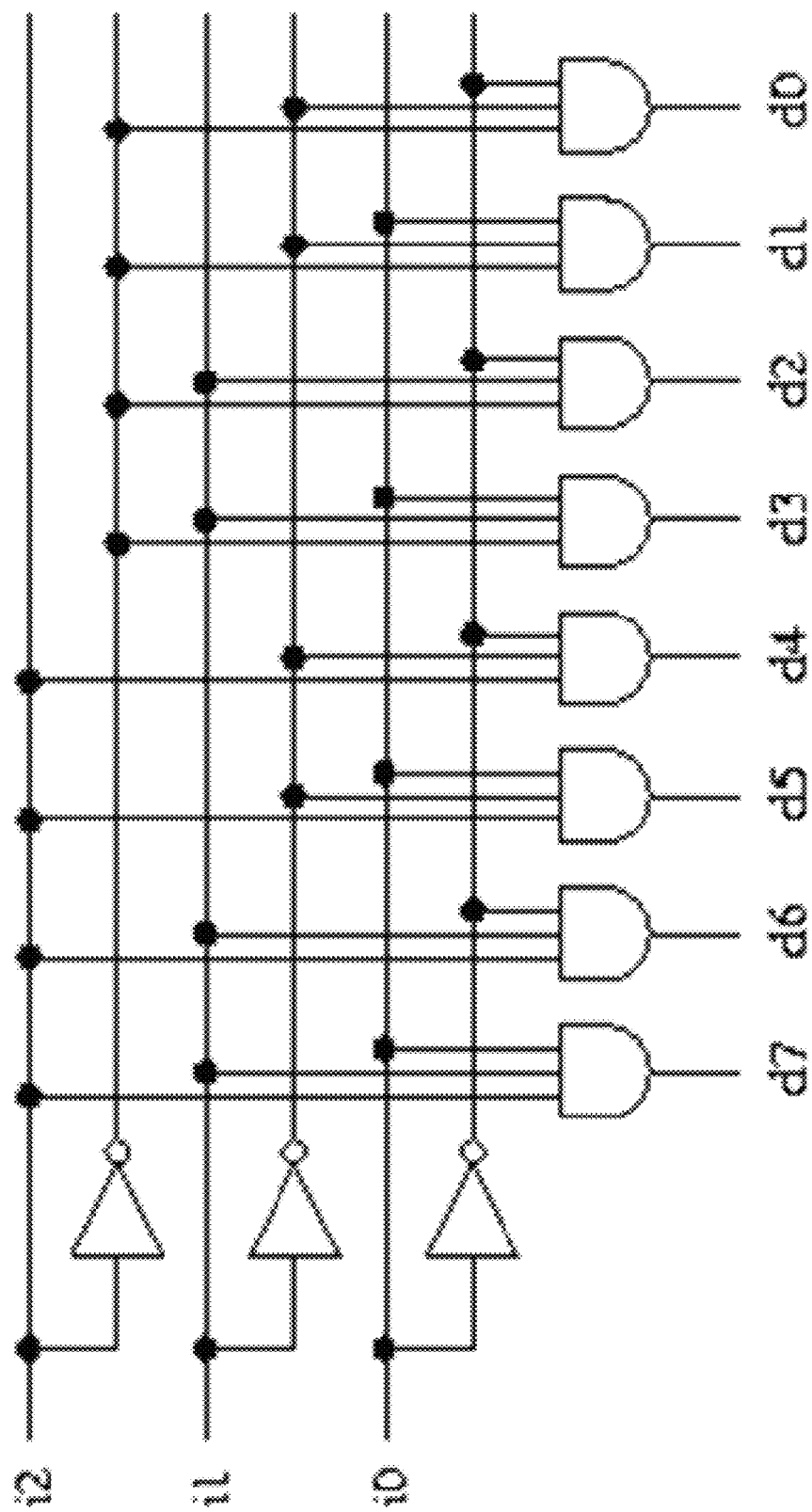

An n-to-2n decoder (e.g., as shown in FIG. 3G) is a combination circuit that converts the binary information from n coded inputs to a maximum of 2n unique outputs and is implemented as a series connection of INVERTER and AND gates. Specifically, in an example, the delay macro model for an n-to-2n decoder computes the delay as a summation of INVERTER delay and (n+1)-input AND delay. The INVERTER and AND gate delays are obtained from standard cell models corresponding to INVERTER and NAND gates.

In an example, the longest signal paths are determined using a topological sort procedure. The topological sort procedure is performed for each of the RTL netlist 106 and the gate-level netlist 108 to determine the longest signal paths of the leaf-level instances and the standard cells, respectively. In performing the topological sort procedure for the RTL netlist 106 or the gate-level netlist 108, the procedure utilizes only two iterations over all of the instances of the netlist, in an example. A topologically sorted sequence of instances places each instance (i.e., each leaf-level instance or standard cell) after all of the instances that drive signals to it. The first traversal over this sequence proceeds from the beginning to the end and calculates the longest upstream path length for each instance (i.e., the length of the longest path from any primary input or upstream sequential instance). The second traversal proceeds in the opposite direction and calculates the longest downstream path length for each instance. The upstream path length is added to the downstream path length to determine the total length of the longest path running through the instance. In addition to path lengths, a type of the longest path may also be determined for each instance during these traversals. Different path types for instances are described in detail below.

As noted above, determining the profiles 114, 116 may include determining a set of attributes for each of the leaf-level instances of the RTL netlist 106 and determining a set of attributes for each of the standard cells of the gate-level netlist 108. In an example, the set of attributes for a leaf-level instance of the RTL netlist 106 includes (i) a path type associated with the longest signal path on which the instance is located in the RTL netlist 106, (ii) a logic type of the instance, and (iii) a clock frequency associated with the instance. Similarly, in an example, the set of attributes for a standard cell of the gate-level netlist 108 includes (i) a path type associated with the longest signal path on which the standard cell is located in the gate-level netlist 108, (ii) a logic type of the standard cell, and (iii) a clock frequency associated with the standard cell.

The path type attribute is determined based on how the path (i.e., the longest signal path on which the leaf-level instance or standard cell lies) is terminated at both ends. Specifically, each signal path has a source terminal and a sink terminal, and the path type attribute is determined based on the source and sink terminals of the signal path. FIG. 4 is a table containing information on different path type attributes that may be utilized in the systems and methods described herein. A first path type illustrated in FIG. 4, "input-to-output" (referred to via an acronym "I2O"), has a source terminal that is a "primary input element" and a sink terminal that is a "primary output element." A second path type, "input-to-sequential" (referred to via an acronym "I2S"), has a source terminal that is a "primary input element" and a sink terminal that is a regular sequential element (i.e., not a primary output element, and thus, a sequential element similar to elements 306, 310 depicted in FIG. 3A).

Continuing in FIG. 4, a third path type, "sequential-to-output" (referred to via an acronym "S2O"), has a source terminal that is a regular sequential element (i.e., not a primary input element) and a sink terminal that is a "primary output element." A fourth path type, "sequential-to-sequential" (referred to via an acronym "S2S"), has source and sink terminals that are both regular sequential elements (i.e., not primary input or output sequential elements). A fifth path type, "clock-domain crossing" (referred to via an acronym "CDC"), has a source terminal that is a sequential element clocked by signal A and a sink terminal that is a sequential element clocked by signal B. It is noted that the path types described above with reference to FIG. 4 are examples only, and that other path types may be utilized in other examples.

With reference again to FIG. 2, for each of the leaf-level instances and standard cells of the netlists 106, 108, respectively, logic type and clock frequency attributes may be determined, as described above. The logic type attribute defines an operator associated with a leaf-level instance or standard cell and corresponds to a logic operation or mathematical operation. Logic type attributes include "AND" logic type, "OR" logic type, "NAND" logic type, addition mathematical operation, and comparison mathematical operation, among others. The clock frequency attribute defines a clock frequency or clock associated with a leaf-level instance or standard cell. In an example, the clock frequency attribute is a number (e.g., "100," which may indicate a clock frequency of 100 MHz, for instance), letter (e.g., "A," which may indicate a "Clock A" of a circuit design), or another type of identifier indicative of a clock, clock domain, or clock-frequency.

Next, at block 118 of FIG. 2, a mapping procedure is performed. The mapping procedure is used, ultimately, to assign standard cells to leaf-level instances of the RTL netlist 106. The assignment of the standard cells to the leaf-level instances enables a power characteristic (e.g., a power consumption) of the RTL netlist 106 to be determined. Steps of the mapping procedure are described in detail below.

In the mapping procedure, a normalization or scaling procedure may be performed on path lengths of the leaf-level instances and/or path lengths of the standard cells. As described above, for each of the leaf-level instances of the RTL netlist 106, a path length that is a length of the longest signal path on which the leaf-level instance is located in the RTL netlist 106 is determined. Similarly, for each of the standard cells of the gate-level netlist 108, a path length that is a length of the longest signal path on which the standard cell is located in the gate-level netlist 108 is determined. Each of the path lengths has a numerical value and a unit of measurement. For example, a path length associated with a standard cell may be "10 ns." Normalizing the path lengths is the process of scaling all path lengths of the leaf-level instances, the standard cells, or both, such that a numerical value of the maximum path length associated with the leaf-level instances equals a numerical value of the maximum path length associated with the standard cells. For example, if a maximum path length associated with the leaf-level instances is "10 units," and a maximum path length associated with the standard cells is "5 ns," path lengths of all standard cells may be scaled by a factor of "2." This scaling causes the maximum path length associated with the standard cells to be "10 ns," and thus, a numerical value of the maximum path length associated with the leaf-level instances ("10") equals a numerical value of the maximum path length associated with the standard cells ("10").

After the scaling, the maximum path length associated with the standard cells may be divided into multiple subranges (i.e., buckets or bins), with each of the subranges comprising a lower limit path length and an upper limit path length. In the example above, where the maximum path length associated with the standard cells is 10 ns after the scaling, the maximum path length may be divided into 10 subranges. A first subrange of the 10 subranges may be labeled "1" and may have a range defined by 0 ns<path_length<1 ns; a second subrange may be labeled "2"

and may have a range defined by 1 ns<path_length<2 ns; and so on. Similarly, the maximum path length associated with the leaf-level instances may be divided into corresponding, multiple subranges. In the example above, where the maximum path length associated with the standard cells is divided into 10 subranges, the maximum path length associated with the leaf-level instances may be divided into 10 corresponding subranges. Thus, for example, a first subrange of these 10 subranges may be labeled "1" and may have a range defined by 0 unit<path_length≤1 unit; a second subrange may be labeled "2" and may have a range defined by 1 unit<path≤length≤2 units; and so on.

Each of the standard cells of the gate-level netlist 108 is associated with a subrange of the multiple subranges, where a standard cell is associated with a subrange based on the standard cell's path length and the lower and upper limits of the subrange. Thus, for instance, a standard cell having a path length of 1 ns may be associated with the subrange labeled "1" in the example above. Similarly, each of the leaf-level instances of the RTL netlist 106 is associated with a subrange of the multiple subranges, where a leaf-level instance is associated with a subrange based on the leaf-level instance's path length and the lower and upper limits of the subrange. Thus, for instance, a leaf-level instance having a path length of 1 unit may be associated with the subrange labeled "1" in the example above.

For each of the standard cells of the gate-level netlist 108, a path length value may be determined based on the subrange to which the standard cell is associated. For example, a standard cell assigned to the subrange labeled "1" may be determined to have a path length value of "1." Similarly, for each of the leaf-level instances of the RTL netlist 106, a path length value may be determined based on the subrange to which the leaf-level instance is associated. For instance, a leaf-level instance assigned to the subrange labeled "1" may be determined to have a path length value of "1."

The performing of the steps described above (e.g., the profiling, assignment of instances to subranges, etc.) causes information to be determined and stored for each of the standard cells and leaf-level instances. Specifically, for each of the standard cells of the gate-level netlist 108, the following are determined and stored: (i) a path length value that is based on a longest signal path on which the standard cell is located in the gate-level netlist 108, (ii) a path type associated with the longest signal path, (iii) a logic type of the standard cell, and (iv) a clock frequency associated with the standard cell. Similarly, for each of the leaf-level instances of the RTL netlist 106, the following are determined and stored: (i) a path length value that is based on a longest signal path on which the instance is located in the RTL netlist 106, (ii) a path type associated with the longest signal path, (iii) a logic type of the instance, and (iv) a clock frequency associated with the instance.

Based on the stored information, the standard cells of the gate-level netlist 108 are partitioned into first subsets, where each of the first subsets contains standard cells having same path length value, path type, logic type, and clock frequency attributes. To illustrate the partitioning of standard cells into first subsets, reference is made to FIG. 5A. FIG. 5A is a table illustrating eight different first subsets and a partitioning of standard cells into these subsets. For example, a first of these subsets has a path length value of "1," a path type of "path 1," a logic type of "NAND," and a clock frequency of "Clk 1." In the example of FIG. 5A, the partitioning of the standard cells indicates that fifty standard cells of the gate-level netlist 108 have these attributes. In the example of FIGS. 2 and 5A, each of the standard cells of the gate-level netlist 108 is associated with one of the eight subsets.

For each of the first subsets, a relative percentage for each type of standard cell included in the first subset is determined, where the relative percentage indicates a percentage of a total number of standard cells of the first subset that are a particular type of standard cell. As noted above with reference to FIG. 5A, fifty standard cells are included in a subset characterized by a path length value of "1," a path type of "path 1," a logic type of "NAND," and a clock frequency of "Clk 1." In FIG. 5B, it is shown that ten of these standard cells are of type "NAND2X1," and forty of these standard cells are of type "NAND2X2." Consequently, as shown in FIG. 5C, for this subset, standard cell type "NAND2X1" has a relative percentage of 20%, and standard cell type "NAND2X2" has a relative percentage of 80%. The collection of relative percentages for a first subset may be known as a "cell distribution." With reference again to FIG. 2, a cell distribution 120 may be a result of the mapping performed at block 118.

Based on the stored information described above (e.g., path length values, path types, logic types, and clock frequencies of RTL instances), the leaf-level instances of the RTL netlist 106 are partitioned into second subsets, where each of the second subsets contains leaf-level instances having same path length value, path type, logic type, and clock frequency attributes. To illustrate the partitioning of leaf-level instances into second subsets, reference is made to FIG. 5D. FIG. 5D is a table illustrating eight different second subsets and a partitioning of leaf-level instances into these subsets. For example, a first of these subsets has a path value of "1," a path type of "path 1," a logic type of "NAND," and a clock frequency of "Clk 1." In the example of FIG. 5A, the partitioning of the leaf-level instances indicates that ten leaf-level instances of the RTL netlist 106 have these attributes. In the example of FIGS. 2 and 5D, each of the leaf-level instances of the RTL netlist 106 is associated with one of the eight subsets.

Following the partitioning of the standard cells and leaf-level instances into the respective first and second subsets, pairs of corresponding first and second subsets are determined. In the example of FIGS. 5A-5D, a first subset of FIG. 5A characterized by a path value of "1," a path type of "path 1," a logic type of "NAND," and a clock frequency of "Clk 1" corresponds to a second subset of FIG. 5D characterized by these same attributes. For each pair of corresponding subsets, standard cells are assigned to the leaf-level instances of the second subset based on the relative percentages of the first subset. To illustrate this, reference is made to FIG. 6A. In this figure, standard cells are assigned to the leaf-level instances of the second subsets in FIG. 5D. Thus, for example, in FIG. 5D, ten leaf-level instances were associated with a second subset characterized by a path value of "1," a path type of "path 1," a logic type of "NAND," and a clock frequency of "Clk 1." In FIG. 6A, standard cells are assigned to these ten leaf-level instances based on the relative percentages of the corresponding first subset, as illustrated in FIG. 5C (i.e., 20% NAND2X1, 80% NAND2X2). As a result, the ten leaf-level instances are associated with two NAND2X1 standard cells and eight NAND2X2 standard cells. The assignment of these standard cells to the leaf-level instances may be done in an arbitrary manner. Thus, in this example, where there is a 1:1 assignment between leaf-level instances and standard cells (e.g., each of the ten leaf-level instances is assigned exactly one standard cell), the two NAND2X1 standard cells and the eight NAND2X2 standard cells may be assigned to individual leaf-level instances of the ten leaf-level instances in any arbitrary manner (e.g., without regard to locations of the leaf-level instances in the model, etc.).

It is thus noted that the assigning of standard cells to leaf-level instances of a second subset based on relative percentages of a first subset may comprise (i) determining a total number of leaf-level instances of the second subset, and (ii) multiplying the total number by the relative percentages for each type of standard cell included in the first subset to generate one or more products, where the standard cells are assigned to the leaf-level instances based on the one or more products. With reference again to FIG. 2, the assignment of standard cells to leaf-level instances is performed at block 122, where one or more standard cells are assigned to each of the leaf-level instances of the RTL netlist 106. In some examples, standard cells are not assigned to leaf-level instances in a 1:1 ratio. RTL leaf-level instances exist at a higher level of abstraction than standard cells, and thus, a single RTL leaf-level instance can be composed of several standard cells. For example, a multibit RTL register leaf-level instance can be composed of several single-bit register standard cells. In FIG. 2, the result of the assignment procedure is a mapped RTL netlist 124, where the mapped RTL netlist 124 includes leaf-level instances that have been associated with standard cells.

Figure 6B:
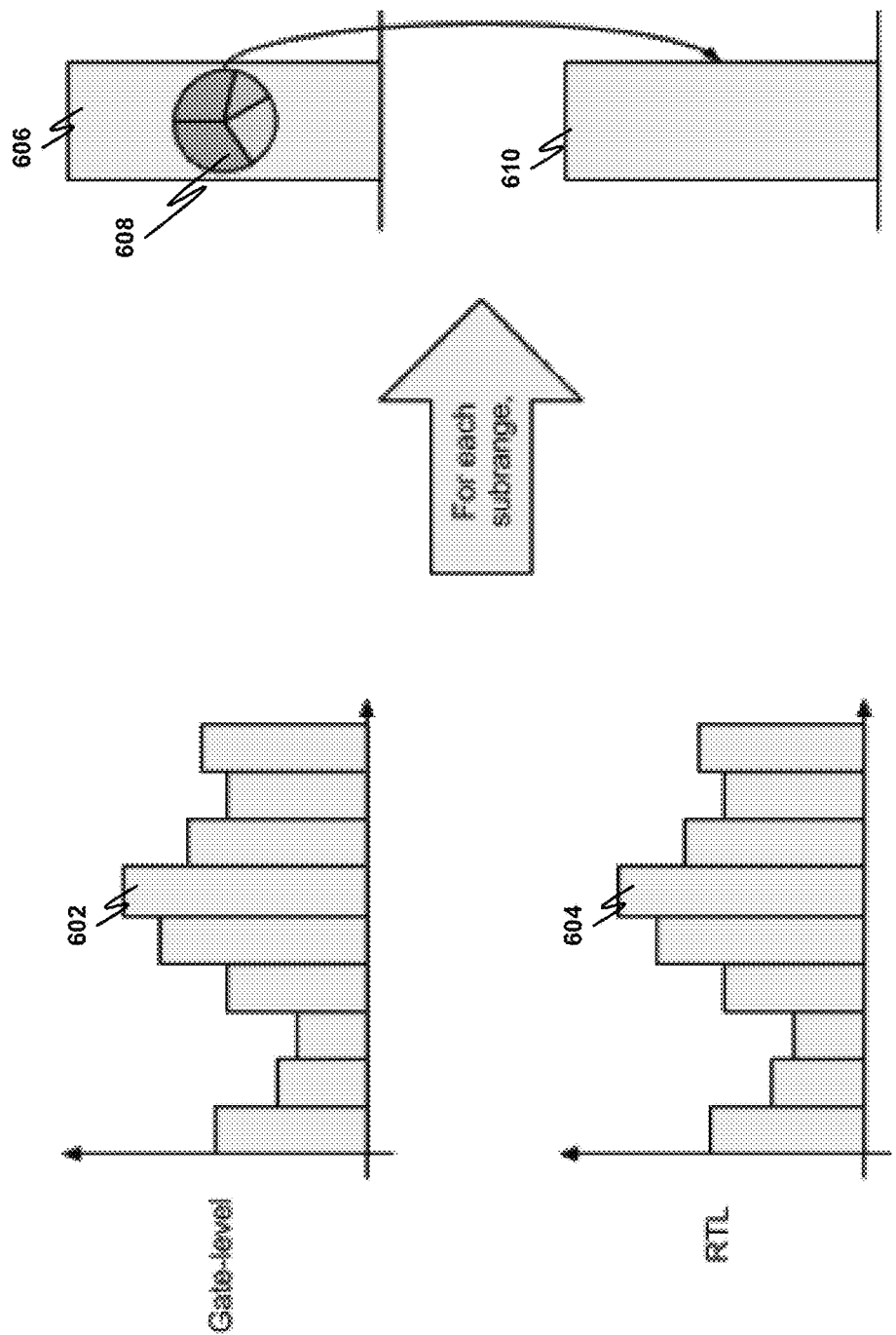
FIG. 6B is a block diagram depicting an example mapping of standard cells to leaf-level instances in accordance with the approaches described herein.

FIG. 6B is a block diagram depicting an example mapping of standard cells to RTL instances in accordance with the approaches described herein. This figure depicts a plurality of gate-level subranges 602 and a plurality of RTL subranges 604. Such subranges are described in further detail above. For each of the subranges 602, a set of standard cells from a gate-level netlist with path lengths (e.g., normalized path lengths) that fall within the subrange 602 is compiled. Similarly, for each of the subranges 604, a set of RTL instances from an RTL netlist with path lengths (e.g., normalized path lengths) that fall within the subrange 604 is compiled. These sets are then categorized by path type, logic type (e.g., function type), and frequency of clock domain, as described above. Then, for each of the resulting subsets, the cell distribution of the gate-level instances is calculated and applied to the RTL instances in the corresponding subset. The applying of a cell distribution is illustrated in FIG. 6B. Specifically, gate-level subrange 606 corresponds to RTL subrange 610. Accordingly, a cell distribution 608 of the gate-level instances of the subrange 606 is applied to the RTL instances of the subrange 610. The application of a cell distribution to RTL instances and the assigning of standard cells to RTL instances are described in further detail above with reference to FIGS. 5A-6A.

Following the assignment of standard cells to leaf-level instances of the RTL netlist 106, a power characteristic of the RTL netlist 106 is determined based on the assigned standard cells. Each of the assigned standard cells is associated with one or more power models. The determining of the power characteristic of the RTL netlist 106 may thus include, for example, determining a power consumption of the RTL netlist 106 based on the power models of the standard cells assigned to the leaf-level instances of the RTL netlist 106.

Figure 7:
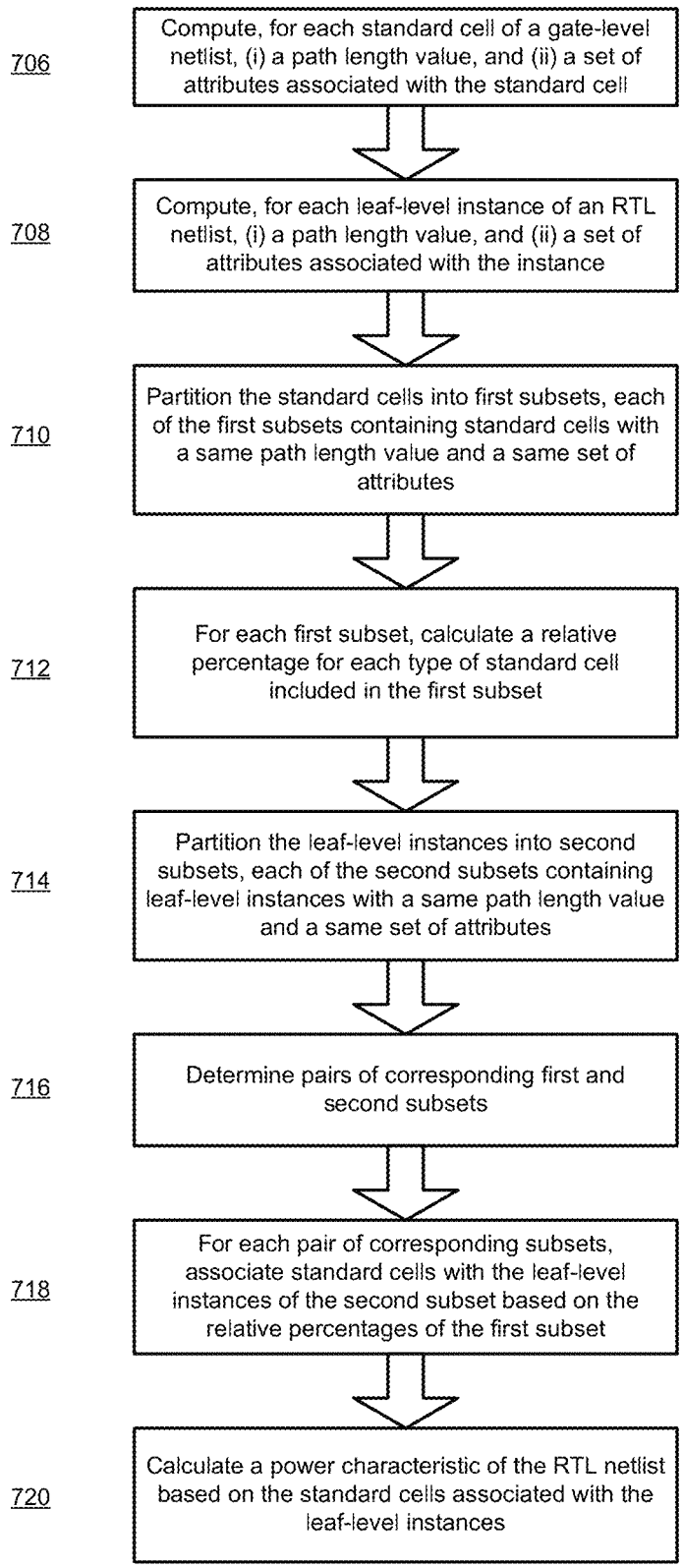
FIG. 7 is a flow diagram depicting example steps of a computer-implemented method for calculating a power characteristic of an RTL netlist of an IC design.

FIG. 7 is a flow diagram depicting example steps of a computer-implemented method for calculating a power characteristic of an RTL netlist of an IC design. At 706, for each standard cell of a gate-level netlist of an IC design, (i) a path length value that is based on a longest signal path on which the standard cell is located in the gate-level netlist, and (ii) a set of attributes associated with the standard cell are computed. At 708, for each leaf-level instance of an RTL netlist of the IC design, (i) a path length value that is based on a longest signal path on which the instance is located in the RTL netlist, and (ii) a set of attributes associated with the instance are computed. The leaf-level instances of the RTL netlist are specified at a higher level of abstraction than the standard cells. At 710, the standard cells are partitioned into first subsets, each of the first subsets containing standard cells with a same path length value and a same set of attributes. At 712, for each first subset, a relative percentage for each type of standard cell included in the first subset is calculated, where the relative percentage indicates a percentage of a total number of standard cells of the first subset that are a particular type of standard cell. At 714, the leaf-level instances are partitioned into second subsets, each of the second subsets containing leaf-level instances with a same path length value and a same set of attributes. At 716, pairs of corresponding first and second subsets are determined. At 718, for each pair of corresponding subsets, standard cells are associated with the leaf-level instances of the second subset based on the relative percentages of the first subset. At 720, a power characteristic of the RTL netlist is calculated based on the standard cells associated with the leaf-level instances. It is noted that steps of the method described herein need not be performed in the order illustrated in FIG. 7.

Figure 8A:
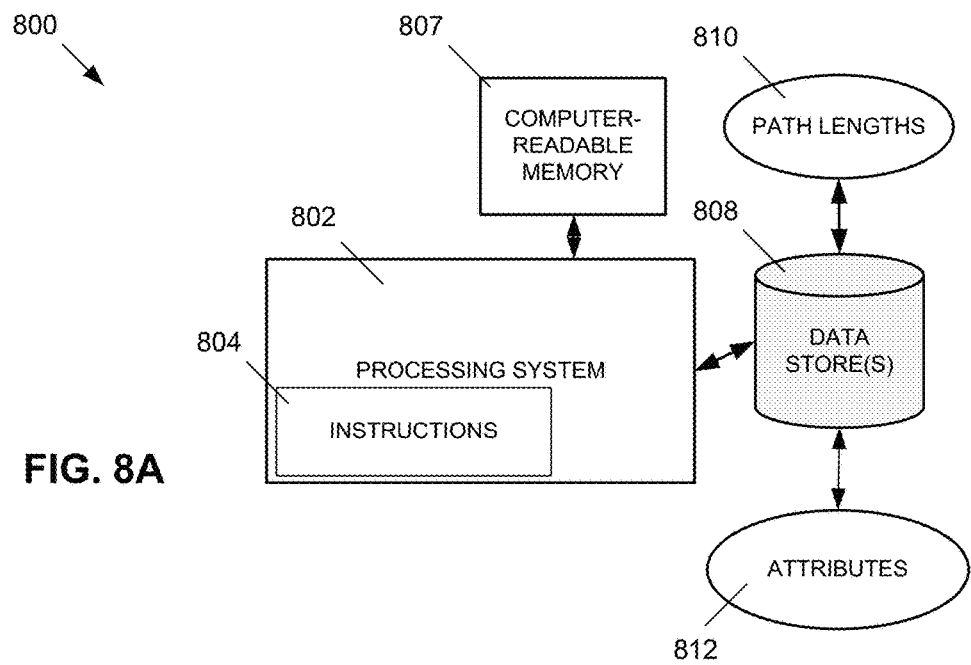
FIGS. 8A, 8B, and 8C depict example systems for determining a power characteristic of an RTL netlist of an IC design.
Figure 8B:
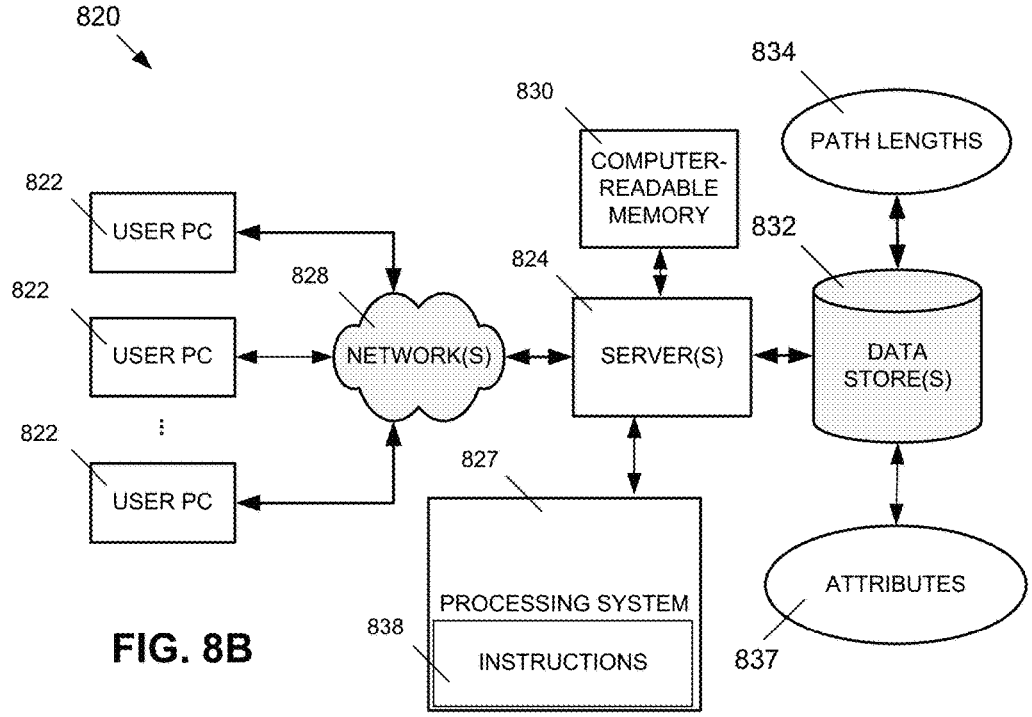
Figure 8C:
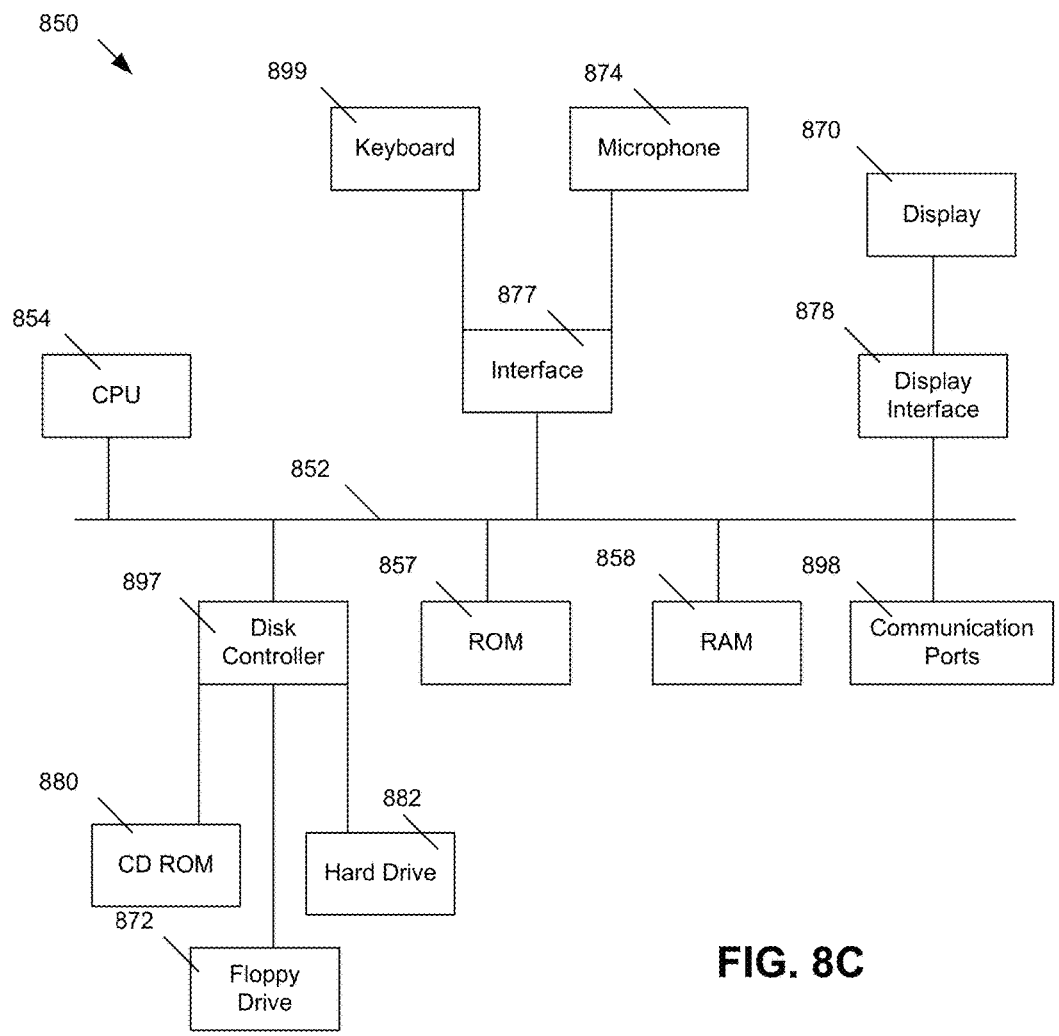

FIGS. 8A, 8B, and 8C depict example systems for determining a power characteristic of an RTL netlist of an IC design. For example, FIG. 8A depicts an exemplary system 800 that includes a standalone computer architecture where a processing system 802 (e.g., one or more computer processors located in a given computer or in multiple computers that may be separate and distinct from one another) includes instructions 804 for generating a gate-level or RTL netlist. The processing system 802 has access to a computer-readable memory 807 in addition to one or more data stores 808. The one or more data stores 808 may include path lengths 810 as well as attributes of instances 812. The processing system 802 may be a distributed parallel computing environment, which may be used to handle very large-scale data sets.

FIG. 8B depicts a system 820 that includes a client-server architecture. One or more user PCs 822 access one or more servers 824 executing instructions 838 for generating a gate-level or RTL netlist on a processing system 827 via one or more networks 828. The one or more servers 824 may access a computer-readable memory 830 as well as one or more data stores 832. The one or more data stores 832 may contain path lengths 834 as well as attributes of instances 837.

FIG. 8C shows a block diagram of exemplary hardware for a standalone computer architecture 850, such as the architecture depicted in FIG. 8A that may be used to contain and/or implement the program instructions of system embodiments of the present disclosure. A bus 852 may serve as the information highway interconnecting the other illustrated components of the hardware. A processing system 854 labeled CPU (central processing unit) (e.g., one or more computer processors at a given computer or at multiple computers), may perform calculations and logic operations required to execute a program. A non-transitory processor-readable storage medium, such as read only memory (ROM) 857 and random access memory (RAM) 858, may be in communication with the processing system 854 and may contain one or more programming instructions for performing the method for determining a power characteristic of an RTL netlist of an IC design. Optionally, program instructions may be stored on a non-transitory computer-readable storage medium such as a magnetic disk, optical disk, recordable memory device, flash memory, or other physical storage medium.

In FIGS. 8A, 8B, and 8C, computer readable memories 807, 830, 857, 858 or data stores 808, 832, 857, 858, 872, 880, 882 may include one or more data structures for storing and associating various data used in the example systems for determining a power characteristic of an RTL netlist of an IC design. For example, a data structure stored in any of the aforementioned locations may be used to associate corresponding first and second subsets. Other aspects of the example systems for determining a power characteristic of an RTL netlist of an IC design may be stored and associated in the one or more data structures.

A disk controller 897 interfaces one or more optional disk drives to the system bus 852. These disk drives may be external or internal floppy disk drives such as 872, external or internal CD-ROM, CD-R, CD-RW or DVD drives such as 880, or external or internal hard drives 882. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 897, the ROM 857 and/or the RAM 858. The processor 854 may access one or more components as required.

A display interface 878 may permit information from the bus 852 to be displayed on a display 870 in audio, graphic, or alphanumeric format. Communication with external devices may optionally occur using various communication ports 898.

In addition to these computer-type components, the hardware may also include data input devices, such as a keyboard 899, or other input device 874, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for modelling a power characteristic of an integrated circuit using a computer-aided design tool, the method comprising:
   accessing, using a computer-aided design tool, a register transfer level (RTL) netlist of an integrated circuit (IC) design; and
   modeling, using a computer-aided design tool, a power characteristic of IC design based on the RTL netlist, by:
      computing, for each standard cell of a gate-level netlist of an IC design, (i) a path length value that is based on a longest signal path on which the standard cell is located in the gate-level netlist, and (ii) a set of attributes associated with the standard cell, wherein the gate-level netlist is not generated based on the RTL netlist and each standard cell is associated with one or more power models;
      computing, for each leaf-level instance of an RTL netlist of the IC design, (i) a path length value that is based on a longest signal path on which the instance is located in the RTL netlist, and (ii) a set of attributes associated with the instance, wherein the leaf-level instances of the RTL netlist are specified at a higher level of abstraction than the standard cells;
      partitioning the standard cells into first subsets, each of the first subsets containing standard cells with a same path length value and a same set of attributes;
      for each first subset, calculating a relative percentage for each type of standard cell included in the first subset, the relative percentage indicating a percentage of a total number of standard cells of the first subset that are a particular type of standard cell;
      partitioning the leaf-level instances into second subsets, each of the second subsets containing leaf-level instances with a same path length value and a same set of attributes;
      determining pairs of corresponding first and second subsets by identifying first and second subsets that are characterized by the same set of attributes;
      for each pair of corresponding subsets, associating standard cells with the leaf-level instances of the second subset based on the relative percentages of the first subset; and
      calculating a power characteristic of the RTL netlist based on the power models of the standard cells associated with the leaf-level instances.

2. The computer-implemented method of claim 1, wherein the set of attributes associated with a standard cell comprises (i) a path type associated with the longest signal path on which the standard cell is located in the gate-level netlist, (ii) a logic type of the standard cell, and (iii) a clock frequency associated with the standard cell;

wherein the set of attributes associated with a leaf-level instance comprises (i) a path type associated with the longest signal path on which the instance is located in the RTL netlist, (ii) a logic type of the instance, and (iii) a clock frequency associated with the instance;

wherein each of the first subsets contains standard cells having same path length value, path type, logic type, and clock frequency attributes; and wherein each of the second subsets contains leaf-level instances having same path length value, path type, logic type, and clock frequency attributes.

3. The computer-implemented method of claim 2, wherein each of the signal paths has a source terminal and a sink terminal, and wherein the path type attribute is determined based on the source and sink terminals of a signal path.

4. The computer-implemented method of claim 1, wherein the RTL netlist is generated based on a hardware description of the IC design using an elaboration process, the elaboration process comprising:

decomposing a logical expression that relates first and second sequential elements of the hardware description into one or more operators, each of the operators being associated with a logic or mathematical operation, and each of the operators being associated with a leaf-level instance of the RTL netlist.

5. The computer-implemented method of claim 1, wherein the first subset of a corresponding pair of subsets contains standard cells with a path length value that corresponds to a path length value of leaf-level instances of the second subset of the pair, and wherein the standard cells of the first subset of the pair have a set of attributes that is same as a set of attributes of the instances of the second subset of the pair.

6. The computer-implemented method of claim 1 comprising:

computing, for each of the standard cells, a path length that is a length of the longest signal path on which the standard cell is located in the gate-level netlist;

computing, for each of the leaf-level instances, a path length that is a length of the longest signal path on which the leaf-level instance is located in the RTL netlist, wherein each path length has a numerical value and a unit of measurement; and scaling path lengths of the standard cells or the leaf-level instances, the scaling causing a numerical value of a maximum path length associated with the standard cells to be equal to a numerical value of a maximum path length associated with the leaf-level instances.

7. The computer-implemented method of claim 6 comprising:

dividing the maximum path length associated with the standard cells into multiple subranges, each of the subranges comprising a lower limit path length and an upper limit path length;

associating each of the standard cells with a subrange of the multiple subranges, wherein a standard cell is associated with a subrange based on the standard cell's path length and the lower and upper limits of the subrange;

determining the path length values for the standard cells based on the subranges with which the standard cells are associated;

dividing the maximum path length associated with the leaf-level instances into multiple subranges, each of the subranges comprising a lower limit path length and an upper limit path length;

associating each of the leaf-level instances with a subrange of the multiple subranges, wherein a leaf-level instance is associated with a subrange based on the leaf-level instance's path length and the lower and upper limits of the subrange; and determining the path length values for the leaf-level instances based on the subranges with which the leaf-level instances are associated.

8. The computer-implemented method of claim 6, wherein a path length for a signal path on which a standard cell is located comprises a sum of propagation delays caused by standard cells located on the signal path, each of the propagation delays being a delay from an input pin of a standard cell to an output pin of the standard cell, and wherein a path length for a signal path on which a leaf-level instance is located comprises a sum of propagation delays caused by leaf-level instances located on the signal path, each of the propagation delays being a delay from an input pin of a leaf-level instance to an output pin of the leaf-level instance.

9. The computer-implemented method of claim 1, wherein the gate-level netlist includes standard cells of a cell set or library that will be used in implementing the RTL netlist.

10. The computer-implemented method of claim 1, wherein each of the leaf-level instances is associated with a logic operation or a mathematical operation.

11. The computer-implemented method of claim 10, wherein the logic operation or the mathematical operation is selected from the group consisting of: an "AND" operation, an "OR" operation, a "NAND" operation, an addition operation, and a comparison operation.

12. The computer-implemented method of claim 1, wherein the gate-level netlist is not generated based on the RTL netlist.

13. The computer-implemented method of claim 1, wherein the power characteristic of the RTL netlist is a power consumption of the RTL netlist.

14. The computer-implemented method of claim 1, wherein each of the standard cells of the gate-level netlist is associated with one or more power models, and wherein the calculating of the power characteristic of the RTL netlist based on the standard cells associated with the leaf-level instances comprises:

computing a power consumption of the RTL netlist based on the power models of the standard cells associated with the leaf-level instances of the RTL netlist.

15. The computer-implemented method of claim 1, wherein the associating of the standard cells with the leaf-level instances of the second subset based on the relative percentages of the first subset comprises:

determining a total number of leaf-level instances of the second subset; and multiplying the total number by the relative percentages for each type of standard cell included in the first subset to generate one or more products, wherein the standard cells are associated with the leaf-level instances based on the one or more products.

16. The computer-implemented method of claim 1, wherein the gate-level netlist is an existing netlist generated in a previous design process.

17. A system for modelling a power characteristic of an integrated circuit using a computer-aided design tool, the system comprising:
- a processing system configured as a computer-aided design tool; and
- computer-readable memory in communication with the processing system encoded with instructions for commanding the computer-aided design tool to execute steps comprising:
- accessing, using a computer-aided design tool, a register transfer level (RTL) netlist of an integrated circuit (IC) design; and
- modeling, using a computer-aided design tool, a power characteristic of IC design based on the RTL netlist, by:
  - computing, for each standard cell of a gate-level netlist of an IC design, (i) a path length value that is based on a longest signal path on which the standard cell is located in the gate-level netlist, and (ii) a set of attributes associated with the standard cell, wherein the gate-level netlist is not generated based on the RTL netlist and each standard cell is associated with one or more power models;
  - computing, for each leaf-level instance of an RTL netlist of the IC design, (i) a path length value that is based on a longest signal path on which the instance is located in the RTL netlist, and (ii) a set of attributes associated with the instance, wherein the leaf-level instances of the RTL netlist are specified at a higher level of abstraction than the standard cells;
  - partitioning the standard cells into first subsets, each of the first subsets containing standard cells with a same path length value and a same set of attributes;
  - for each first subset, calculating a relative percentage for each type of standard cell included in the first subset, the relative percentage indicating a percentage of a total number of standard cells of the first subset that are a particular type of standard cell;
  - partitioning the leaf-level instances into second subsets, each of the second subsets containing leaf-level instances with a same path length value and a same set of attributes;
  - determining pairs of corresponding first and second subsets by identifying first and second subsets that are characterized by the same set of attributes;
  - for each pair of corresponding subsets, associating standard cells with the leaf-level instances of the second subset based on the relative percentages of the first subset; and
  - calculating a power characteristic of the RTL netlist based on the power models of the standard cells associated with the leaf-level instances.

18. The system of claim 17,
wherein the set of attributes associated with a standard cell comprises (i) a path type associated with the longest signal path on which the standard cell is located in the gate-level netlist, (ii) a logic type of the standard cell, and (iii) a clock frequency associated with the standard cell;
wherein the set of attributes associated with a leaf-level instance comprises (i) a path type associated with the longest signal path on which the instance is located in the RTL netlist, (ii) a logic type of the instance, and (iii) a clock frequency associated with the instance;
wherein each of the first subsets contains standard cells having same path length value, path type, logic type, and clock frequency attributes; and
wherein each of the second subsets contains leaf-level instances having same path length value, path type, logic type, and clock frequency attributes.

19. The system of claim 18, wherein each of the signal paths has a source terminal and a sink terminal, and wherein the path type attribute is determined based on the source and sink terminals of a signal path.

20. A non-transitory computer-readable storage medium for modelling a power characteristic of an integrated circuit using a computer-aided design tool, when executed by a processing system configured as a computer-aided design tool, cause the computer-aided design tool to execute steps comprising:
- computing, for each standard cell of a gate-level netlist of an IC design, (i) a path length value that is based on a longest signal path on which the standard cell is located in the gate-level netlist, and (ii) a set of attributes associated with the standard cell;
- accessing, using a computer-aided design tool, a register transfer level (RTL) netlist of an integrated circuit (IC) design; and
- modeling, using a computer-aided design tool, a power characteristic of IC design based on the RTL netlist, by:
  - computing, for each leaf-level instance of an RTL netlist of the IC design, (i) a path length value that is based on a longest signal path on which the instance is located in the RTL netlist, and (ii) a set of attributes associated with the instance, wherein the leaf-level instances of the RTL netlist are specified at a higher level of abstraction than the standard cells, wherein the gate-level netlist is not generated based on the RTL netlist and each standard cell is associated with one or more power models;
  - partitioning the standard cells into first subsets, each of the first subsets containing standard cells with a same path length value and a same set of attributes;
  - for each first subset, calculating a relative percentage for each type of standard cell included in the first subset, the relative percentage indicating a percentage of a total number of standard cells of the first subset that are a particular type of standard cell;
  - partitioning the leaf-level instances into second subsets, each of the second subsets containing leaf-level instances with a same path length value and a same set of attributes;
  - determining pairs of corresponding first and second subsets by identifying first and second subsets that are characterized by the same set of attributes;
  - for each pair of corresponding subsets, associating standard cells with the leaf-level instances of the second subset based on the relative percentages of the first subset; and
  - calculating a power characteristic of the RTL netlist based on the power models of the standard cells associated with the leaf-level instances.

* * * * *